United States Patent [19]

Terada et al.

[11] 4,219,764
[45] Aug. 26, 1980

[54] APPARATUS FOR USE WITH A MOTOR DRIVE

[75] Inventors: Katumi Terada; Kazuyuki Nemoto, both of Hachioji, Japan

[73] Assignee: Olympus Optical Company Ltd., Tokyo, Japan

[21] Appl. No.: 807,396

[22] Filed: Jun. 17, 1977

[30] Foreign Application Priority Data

Jul. 9, 1976 [JP] Japan .............................. 51-92171[U]

[51] Int. Cl.² .............................................. H02P 1/54
[52] U.S. Cl. ............................................ 318/48; 318/8; 310/112; 310/83; 310/75 R
[58] Field of Search ............... 310/112, 122, 115, 118, 310/83, 74, 75, 51; 318/7, 8, 48

[56] References Cited

U.S. PATENT DOCUMENTS

| | | | |
|---|---|---|---|
| 2,412,551 | 12/1946 | Pratt et al. | 353/95 |
| 2,621,225 | 12/1952 | Hargreaves et al. | 310/74 X |
| 3,434,025 | 3/1969 | Parkinson et al. | 318/48 X |
| 3,454,779 | 7/1969 | Meijer | 310/112 X |
| 3,498,569 | 3/1970 | Kjos | 310/112 X |

Primary Examiner—Donovan F. Duggan
Attorney, Agent, or Firm—Weinstein & Sutton

[57] ABSTRACT

An apparatus is provided for use with a motor drive for cancelling a reaction energy of a drive motor upon rapid starting or sudden stop. The apparatus comprises a revolving member adapted to be operatively connected with the rotor of the drive motor. The member has an inertia which is equal to that of the rotor, and is adapted to be connected with the latter in the opposite sense therefrom.

2 Claims, 4 Drawing Figures

APPARATUS FOR USE WITH A MOTOR DRIVE

BACKGROUND OF THE INVENTION

The invention relates to an apparatus for use with a motor drive.

For purpose of illustration, the invention will be described below in connection with a motor drive system associated with a film winding device of a photographic camera. Such device recently employs a motor for automatic film winding. As each frame of the film is fed, the motor must be started and stopped rapidly, giving rise to a reaction energy in the opposite sense from the direction of rotation of the motor. Such a reaction energy may result in an impact or jolt being undesirably applied to the winding device including the motor housing and a support therefor as well as to the camera body. In particular, such an impact to the camera body may cause a dislocation of the film.

SUMMARY OF THE INVENTION

It is an object of the invention to provide an apparatus for use with a motor drive which includes a revolving member having an inertia equal to that of the rotor of the motor for cancelling any reaction energy which may be produced when the motor is rapidly or suddenly started and stopped.

In accordance with the invention, the revolving member is operatively connected with the motor so as to operate in the opposite sense from the rotor. In this manner, when the motor is rapidly started and stopped, the reaction energy of the rotor is cancelled by the reaction energy of the revolving member, precluding the occurrence of any impact.

DESCRIPTION OF PREFERRED EMBODIMENTS

Figure 1:
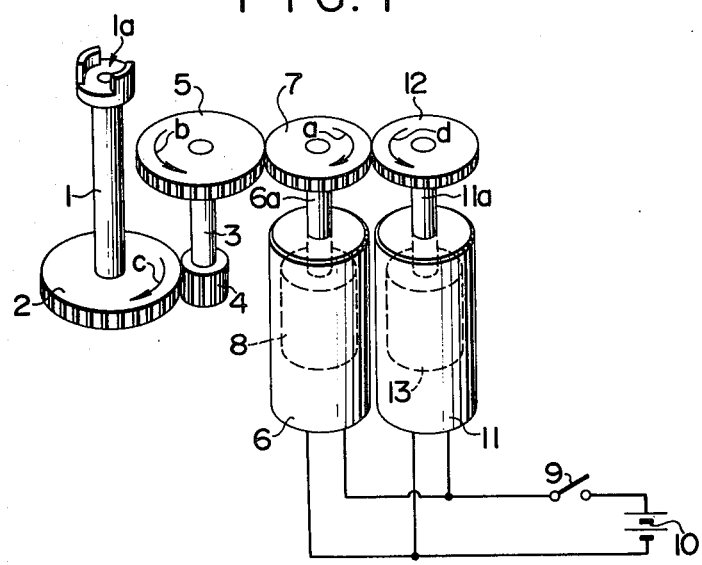
FIG. 1 is a perspective view of an apparatus constructed in accordance with one embodiment of the invention.

Referring to FIG. 1, there is shown one embodiment of the invention as applied to a film winding device of a camera. The device includes a drive shaft 1 having an upper forked end 1a and fixedly carrying a drive gear 2 at its lower end. A rotary shaft 3 has a pinion gear 4 fixedly mounted thereon, which meshes with the gear 2. A gear 5 of a larger diameter is fixedly mounted on the shaft 3 and can be driven by meshing engagement with an output gear 7 fixedly mounted on the output shaft 6a of a drive motor 6 which may be a conventional design. The motor includes a rotor 8, and also a stator, commutator and brush assembly which are not shown for purposes of simplicity, and is connected through a power switch 9 with a power source 10.

In operation, after a photographing operation is completed by shutter release, a film winding button (not shown) may be depressed to close the switch 9, whereupon the motor 6 is energized. The output gear 7 is driven for rotation in a direction indicated by an arrow a, for example, and its meshing gear 5 rotates in a direction indicated by an arrow b to transmit the rotating power to the drive gear 2 through the pinion gear 4, thus rotating the drive shaft 1 in a direction indicated by an arrow c. As the drive shaft 1 rotates, the film winding shaft (not shown) which is engaged by the forked end 1a of the shaft 1 winds up the film frame one which a picture has been taken. When on frame of the film is wound up, a braking unit (not shown) operates to snub the shaft 1, and simultaneously the switch 9 opens to deenergize the motor 6. At this moment, a reaction energy is produced due to the snubbing of the motor 6, applying an impact to the motor casing and a support therefor in a direction opposite from the direction of rotation of the output shaft 6a.

In accordance with the invention, there is provided a revolving member which acts to cancel the reaction energy of the motor 6. In the embodiment shown in FIG. 1, the member comprises a rotor 13 of a motor 11 which is constructed in the same way as and has an inertia equal to that of the motor 6. The motor 11 is connected in parallel with the motor 6, and has an output shaft 11a on which an output shaft a gear 12, meshing with the gear 7, is fixedly mounted. Thus the gear 12 rotates in a direction indicated by an arrow d and the shaft 11a rotates in the opposite direction from the shaft 6a.

When the motor 6 is rapidly started or stopped, the motor 11 is also rapidly started or stopped, and a reaction energy is created by each motor at this moment. However, since the direction of rotation of each motor is opposite that of the other, the reaction energies are created in opposite directions and hence cancel each other because of their equal forces of inertia.

It is desirable that the two motors 6, 11 be disposed as close to each other as possible. When the two motors are used in the manner mentioned above, only one-half output is required of each motor as compared with the use of a single motor. The power dissipation of each motor is also halved, thus resulting in a total power dissipation which is equal to that of the single motor.

Figure 2:
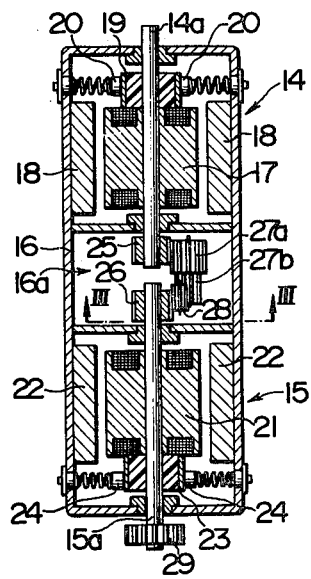
FIG. 2 is a sectional view of another embodiment.
Figure 3:
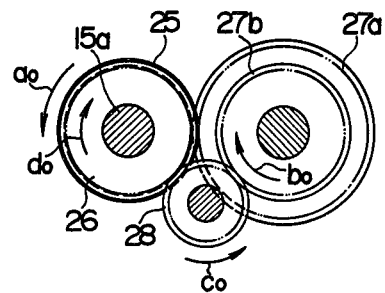
FIG. 3 is a cross section taken along the line III—III shown in FIG. 2.

FIG. 2 shows another embodiment in which a pair of motors 14,15 are assembled within a common casing 16 and are connected in tandem by a gear train so that their output shafts 14a, 15a rotate in the opposite directions. Specifically, the motor 14 is housed within the upper half of the elongated tubular casing 16 and comprises output shaft 14a, rotor 17, stator 18, commutator 19 and brushes 20. The motor 15 is housed within the lower half of the casing and comprises output shaft 15a, rotor 21, stator 22, commutator 23 and brushes 24. The top end of output shaft 14a is rotatably supported by a bearing in alignment with the center axis of the casing 16, as is also the bottom end of output shaft 15a. Intermediate the respective motor compartments, the casing 16 includes a gear chamber 16a into which the output shafts 14a, 15a extend. A pair of gears 25, 26 of an equal diameter are fixedly mounted on the end of each of the respective shafts. The gear 25 is in meshing engagement with a gear 27a of a greater diameter, which forms part of a stepped connecting gear together with a gear 27b of a smaller diameter. The gear 27b is in meshing engagement with an intermediate gear 28 which in turn meshes with the gear 26. It will be seen that the gear train connects the output shafts 14a, 15a together in a manner such that they rotate in opposite directions. Specifically, referring to FIG. 3, it will be noted that when the shaft 14a and the gear 25 rotate in a direction indicated by an arrow $a_o$, the gear 27a which meshes with it will rotate in a direction indicated by an arrow $b_o$ with its integral gear 27b while the intermediate gear 28 will rotate in a direction indicated by an arrow $c_o$ to cause the gear 26 and the output shaft 15a to rotate in a direction indicated by an arrow $d_o$. Thus the shafts 14a, 15a will rotate in the opposite directions.

The rotors 17, 21 of both motors are constructed so as to have equal values of inertia. The lower motor 15 is used as a drive motor, and an output gear 29 is fixedly mounted on the lower end of the output shaft 15a which extends out of the casing 16. The upper motor 14 is utilized as a revolving member which is used to cancel the reaction energy. The operation of the revolving member is same as mentioned above.

Figure 4:
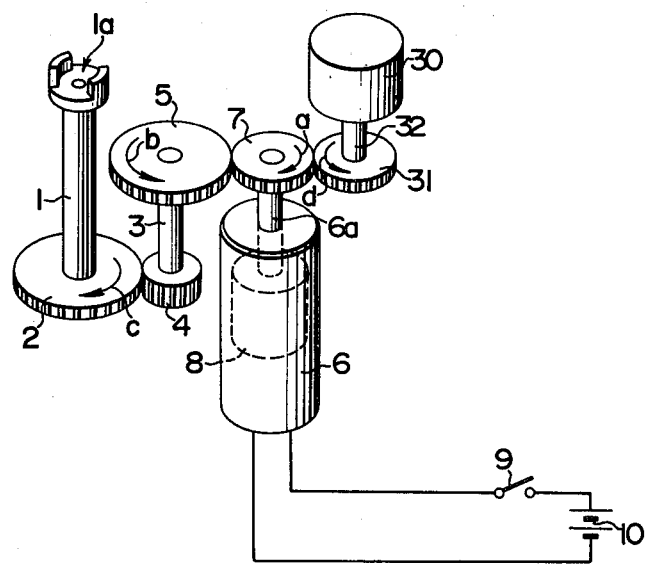
FIG. 4 is a perspective view of a further embodiment.

FIG. 4 shows a further embodiment in which the revolving member comprises a balancer 30 capable of producing a force of inertia which is comparable to that of the rotor of the drive motor. The film winding device shown in FIG. 4 is identical to that shown in FIG. 1, comprising the components 1 to 8. In the arrangement of FIG. 4, a gear 31 which is maintained in meshing engagement with the gear 7 is fixedly mounted on a shaft 32, which also carries a balancer 30. The balancer 30 comprises a solid cylindrical body capable of producing a force of inertia comparable to that produced by the rotor 8 of the motor 6. It will be seen that since the balancer 30 is driven by the gear 31 for rotation in the opposite direction from the output shaft 6a of the motor 6, a cancellation of any reaction energy created by the motor 6 upon a rapid start or stop can be achieved.

It should be understood that while the invention has been illustrated in connection with a film winding device, it is not limited thereto but is equally applicable to any other winding or take-up device incorporating a drive motor, including a tape take-up device of a tape recorder.

What is claimed is:

1. Apparatus for use in cancelling the jolt caused by the sudden stopping and/or starting of a drive motor, said drive motor comprising a rotor and a first gear drivable by said rotor, the apparatus comprising:
    balancing means having a rotatable member whose inertial characteristics resemble the rotor of said drive motor;
    a second gear coupled to rotate with said rotatable member and engaging said first gear;
    an output shaft 1;
    coupling gears meshing with one of said first and second gears for driving said output shaft whereby said rotor and said rotating member rotate in opposite directions so that their reaction energies caused by sudden stops or starts of the drive motor tend to cancel one another.

2. The apparatus of claim 1 wherein the rotational axes of said first and second gears lie on a common axis.

* * * * *

UNITED STATES PATENT AND TRADEMARK OFFICE
CERTIFICATE OF CORRECTION

PATENT NO. : 4,219,764
DATED : August 26, 1980
INVENTOR(S) : Katumi Terada, et al It is certified that error appears in the above—identified patent and that said Letters Patent is hereby corrected as shown below:

Column 2, line 4, change "one" to --on--.

Column 2, line 5, change "on" to --one--.

Signed and Sealed this

Fifth Day of May 1981

[SEAL]

Attest:

RENE D. TEGTMEYER

Attesting Officer  Acting Commissioner of Patents and Trademarks